United States Patent [19]
Rapp

[11] 3,821,856
[45] July 2, 1974

[54] COMPOUND GAUGE DEVICES FOR MEASURING THE AXIAL CURVATURE OF A TUBE

[75] Inventor: Willard Emanuel Rapp, Franklin Twp., Somerset County, N.J.

[73] Assignee: Western Electric Company, Incorporated, New York, N.Y.

[22] Filed: Apr. 21, 1972

[21] Appl. No.: 246,372

[52] U.S. Cl............................. 33/178 E, 33/174 R
[51] Int. Cl.... G01b 7/28, G01b 19/26, E21b 47/08
[58] Field of Search........... 33/178 E, 178 F, 147 N, 33/147 D, 143 L, 148, 172 E

[56] References Cited
UNITED STATES PATENTS

| | | | |
|---|---|---|---|
| 2,514,847 | 7/1950 | Coroniti et al. | 33/147 N |
| 2,695,457 | 11/1954 | Roberts | 33/178 F |
| 2,973,583 | 3/1961 | Stolle et al. | 33/178 F |
| 3,103,072 | 9/1963 | Golley et al. | 33/143 L |
| 3,416,233 | 12/1968 | Steele et al. | 33/147 D |
| 3,436,836 | 4/1969 | Metevia | 33/178 F |
| 3,488,856 | 1/1970 | Wiklund | 33/178 F |
| 3,624,684 | 11/1971 | McCaslin | 33/178 F |

Primary Examiner—Harry N. Haroian
Attorney, Agent, or Firm—E. W. Pfeifle; A. S. Rosen

[57] ABSTRACT

A compound gauge device includes a carrier on which is mounted two wall curvature gauges in diametrically opposite positions for independent radial movement and for combined axial movement through a tube. Each wall curvature gauge includes a radially movable probe mounted between two feet located at axially opposite sides of the probe. The feet and probe of each gauge bear against an adjacent, inner wall surface of the tube. The radial position of each probe relative to a line joining two reference points on the wall surface, corresponding to the two points engaged by the two associated feet, establishes the radial displacement of a contacted test point which corresponds to the curvature of said wall surface.

The coil of an axially mounted linear variable differential transformer (LVDT) is mechanically coupled to one of the probes, while the other probe is mechanically coupled to the core of the LVDT. As the compound gauge is advanced through the tube, a continuous electrical output signal having a voltage proportional to the difference in relative radial displacements of the two probes with repsect to their associated reference lines is generated by the LVDT to indicate the axial curvature of the tube.

16 Claims, 2 Drawing Figures

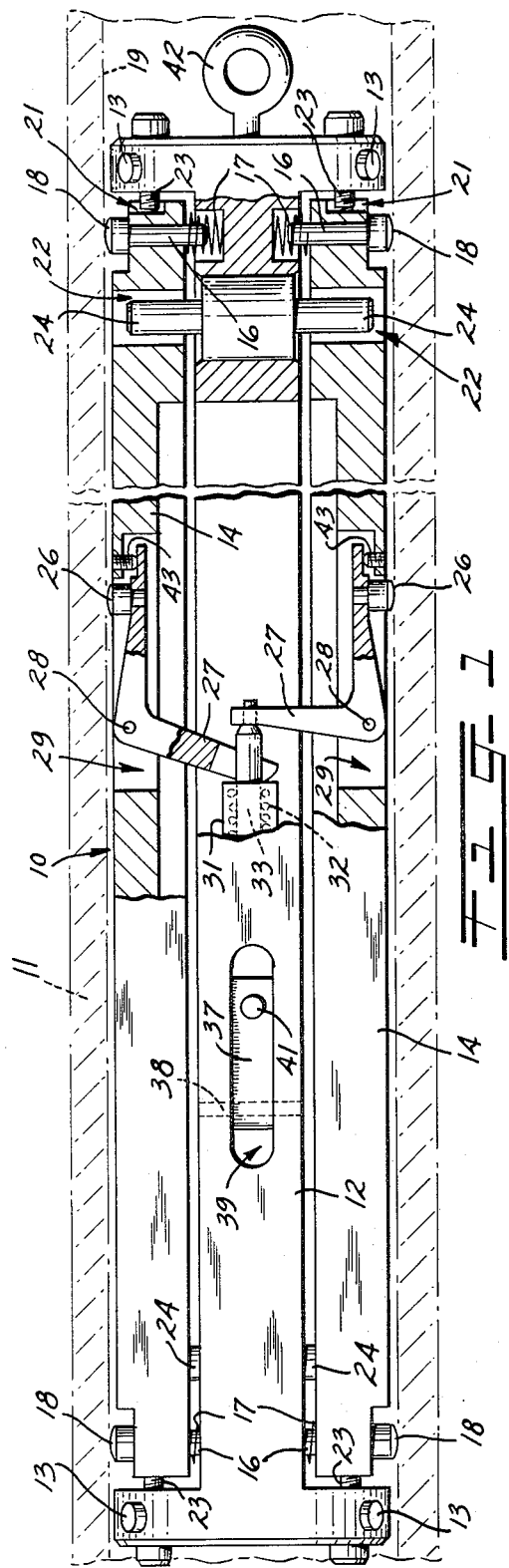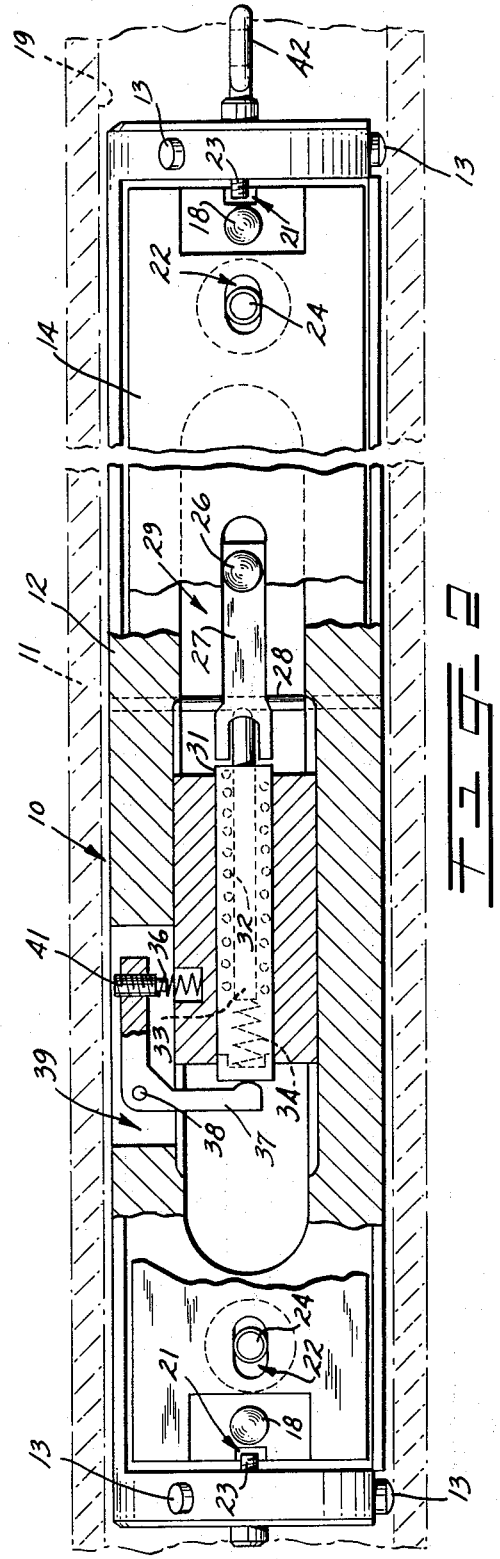

COMPOUND GAUGE DEVICES FOR MEASURING THE AXIAL CURVATURE OF A TUBE

RELATED APPLICATION

This patent application is closely related to a U.S. Pat. No. 3,780,442 issued to W. M. Gresho on Methods and Compound Gauge Devices for Measuring the Axial Curvature of a Tube, filed on the same date as this application.

BACKGROUND OF THE INVENTION

This invention relates to apparatus for measuring the axial curvature of a tube and, more particularly, to apparatus for measuring the axial curvature of a tube by providing a single, real time indication of the axial curvature.

In the manufacture of certain tubes, e.g., in forming sections of tubing for use in transmitting millimeter wavelength communication signals, it may be necessary that the axial curvature of each section, i.e., the departure from perfect straightness, be minimal. A minimum radius of 2,500 feet is typically desired for waveguide tubes of approximately 2 inch inner diameter, with a root-mean-square average radius of curvature of at least 5,000 feet. Detailed, accurate measurement of the axial curvature of such tubes is, thus, necessary. Precise axial curvature measurement is, however, an involved undertaking, in that curvature ordinarily must be examined at a large number of points along the axis of a rather long section of tubing, e.g., 5 or 10 meters long. The curvature examination should preferably be continuous, i.e., examination along an infinite number of points between the ends of each tube.

Only one type of device, other than that hereinafter disclosed, is considered well suited for providing a very precise and reliable, real time indication of the axial curvature of a tube. Such device forms a part of the subject matter of U.S. Pat. 3,780,442 to W. M. Gresho mentioned above. An embodiment of a compound gauge, disclosed in the copending patent application, includes a carrier on which two wall curvature gauges are mounted in diametrically opposite positions for independent radial movement and for combined axial movement through a tube. Each wall curvature gauge incudes a radially movable probe mounted between two feet at axially opposite sides of the probe. The feet and the probe of each gauge bear against an adjacent, inner wall surface of the tube. Thus, for each gauge, the radial position of the probe establishes the radial displacement of a contacted test point on the inner wall surface relative to a line which joins two reference points on the inner wall surface engaged by the two feet.

The described compound gauge is advanced through the interior of the tube with the probes oriented in a horizontal plane, while electrical signals from two radially mounted, linear variable differential transformers (LVDT's), one coupled to each probe, indicate the radial positions of the two probes. A single, continuous, electrical output signal, having a voltage corresponding to the difference in the voltages of the signals from the two LVDT's, is generated. This continuous difference signal is indicative of a component of the axial curvature along the tube in the plane of the two probes.

SUMMARY OF THE INVENTION

An object of the invention resides in new and improved apparatus for measuring the axial curvature of a tube.

The invention contemplates the provision of a compound gauge including a carrier on which two wall curvature gauges are mounted in diametrically opposite positions for independent radial movement and for combined axial movement through a tube. Each wall curvature gauge includes a radially movable probe mounted between two feet at axially opposite sides of the probe. The feet and the probe of each gauge bear against an adjacent, inner wall surface of the tube. Thus, for each gauge, the radial position of the probe establishes the radial displacement of a contacted test point on the inner wall surface relative to a line which joins two reference points engaged by the two feet. The carrier, and with it the two independently mounted wall curvature gauges, is advanced through the interior of the tube with the probes oriented in a horizontal plane. As described thus far, the compound gauge device of the invention is similar to the compound gauge device disclosed in U.S. Pat. No. 3,780,442 issued to W. M. Gresho discussed previously.

The device of the invention departs from the device of the copending W. M. Gresho application, and to a certain extent simplifies the structure disclosed in the copending application, through the use in the compound gauge of a single axially mounted LVDT, rather than two radially mounted LVDT's. A mechanical coupling interconnects one of the probes with a coil of the single LVDT. Another mechanical coupling interconnects the other of the probes with a core axially movable within the LVDT coil. Radial movements of the two probes are transmitted as relative axial movements of the coil and the core. A single, continuous, electrical output signal, provided by the single LVDT, has a voltage which varies with the radial distance between the two probes and is, thus, indicative of a component of the axial curvature along the tube in the plane of the two probes.

BRIEF DESCRIPTION OF THE DRAWING

FIG. 1 of the drawing is a plan view, partly in section, of a single LVDT, compound gauge device for measuring the axial curvature of a tube in accordance with the principles of the invention, illustrating the compound gauge housed within a section of the tube; and FIG. 2 is a side elevational view of the section of the tube and the compound gauge of FIG. 1, showing additional aspects of the compound gauge.

DETAILED DESCRIPTION

Referring to FIGS. 1 and 2 of the drawing, a compound gauge 10 is located within a tube 11. The tube is typically of right circular cylindrical periphery, and may be formed of any suitable material, e.g., steel. The compound gauge 10 includes a carrier frame 12 which is supported within the tube 11 on spring-loaded, radially extending plungers 13,13 located at the ends of the carrier frame.

Two probe carrier bars 14,14, constituting the main structural members of two individual wall curvature gauges, are located at diametrically opposed positions on the frame. Each probe carrier bar 14 includes two feet 16,16 one adjacent to each end of the bar. A compressed spring 17 is associated with each foot 16. Radially inward ends of the four springs 17,17 bear against the frame 12, while radially outward ends of the springs bear against the probe carrier bars 14,14 adjacent to radially innermost ends of the feet 16,16. The arrangement is such that the probe carrier bars 14,14 are mounted for movement in a radial direction independently of one another, while the springs 17,17 force the bars radially outwardly, maintaining continuous contact between radially outermost tips 18,18 of the feet 16,16 and an inner wall 19 of the tube 11.

Each probe carrier bar 14 has a pair of radially extending recesses 21,21, one at each end of the bar and located axially outwardly from the proximate foot 16, and a pair of apertures 22,22 passing radially through the bar axially inwardly of the feet 16,16. Studs 23,23 project axially from the frame 12 into respective ones of the recesses 21,21 to limit outward movements of the probe carrier bars when the compound gauge 10 is removed from the tube 11. Pins 24,24, which extend radially outwardly from the frame 12 into respective ones of the apertures 22,22, also serve to maintain the structural integrity of the compound gauge while the compound gauge is outside of the tube.

Each probe carrier bar 14 includes a probe 26 located between the feet 16,16 of the carrier bar, e.g., at the longitudinal center of the carrier bar. Each probe 26 is mounted on a different one of two right angle levers 27,27, with each lever constrained to pivot about a pin 28 fixed to one or the other of the carrier bars 14,14. Openings 29,29, one in each carrier bar, house the levers 27,27 and the pins 28,28. Each probe carrier bar 14,14, along with the structure which it supports, constitutes an independent wall curvature gauge movable axially along the interior of the tube with axial movement of the carrier frame 12.

A linear variable differential transformer (LVDT) 31 is mounted along the axis of the compound gauge 10. The LVDT 31 includes a coil 32 coaxially surrounding a magnetic core 33. The core is mounted for independent axial movement within the coil. A spring 34 within the LVDT continuously urges the core 33 in a direction toward one end of the LVDT, i.e., toward the right in FIG. 2. The body of the LVDT, and with it the coil 32, is continuously urged in the same direction as the core by a spring 36 and an additional right angle lever 37, also toward the right in FIG. 2. The additional lever 37, and a pin 38 about which the lever pivots, are housed within an opening 39 in the frame 12. A threaded stud 41 provides a mechanism for adjusting the force imposed on the additional lever 37 by the spring 36.

The end of one of the levers 27,27, remote from the end of the lever which carries the probe 26, engages the body of the LVDT 31. A corresponding end of the other lever 27 engages the core 33 of the LVDT. Any radial movements of the probes 26,26, when the compound gauge 10 is displaced axially through the tube, e.g., by tension in a pull wire connected to an eye bolt 42, will cause concomitant pivotal movements of the respective levers 27,27. The levers will, in turn, transmit independent axial movements to the body and coil 32 of the LVDT, on the one hand, and to the core 33 of the LVDT, on the other hand. Meanwhile, the respective springs 34 and 36, which bias the core and the body of the LVDT toward the right in FIG. 2, will urge the levers 27,27 to pivot about the pins 28,28. The biasing effect of the springs 34,36 will maintain the probes 26,26 in continuous contact with a continuous series of test points on the inner wall 19 of the tube 11 as the compound gauge advances through the tube. Adjustable studs 43,43 (FIG. 1) on the probe carrier bars 14,14 are adapted to limit pivotal movement of the levers 27,27 when the compound gauge 10 is removed from the tube.

In the operation of the compound gauge 10, the device is placed within the tube 11 with the probes 26,26 preferably located in a horizontal plane, and is then advanced axially along the interior of the tube. Meanwhile, an electrical output signal is generated continuously by the LVDT 31 and is transmitted by a cable (not shown) to conventional, external equipment, e.g., a voltmeter, for indicating the voltage of the signal.

As the compound gauge 10 is displaced through the tube 11, the probes 26,26 are maintained in continuous contact with the inner wall 19 of the tube by the forces transmitted from the respective springs 34,36. At the same time, the feet 16,16 of each probe carrier bar 14 are maintained in continuous contact with the tube inner wall by forces transmitted from the springs 17,17. The radially outermost tips 18,18 of the feet 16,16 on each bar define a reference line. The radial displacement of each probe 26 relative to the reference line provided by the associated bar 14 is indicated by the pivotal position of the lever 27 on which the probe is mounted.

It should be noted that an LVDT functions most reliably when its core is actuated axially without any forces exerted perpendicularly to the axis of the core. The compound gauge 10 meets this important criterion through the use of the right angle levers 27,27, which translate radial movements of the probes 26,26 into relative axial movements which are sensed by the LVDT 31.

As discussed more particularly in U.S. Pat. No. 3,780,442 issued to W. M. Gresho, mentioned previously, the curvature of the inner wall 19 of the tube 11 in the vicinity of each probe 26 is a function of the radial displacement of the probe relative to the reference line joining the tips 18,18 of the feet 16,16 adjacent to the ends of the carrier bar 14 supporting the probe. As also discussed in the previously mentioned W. M. Gresho patent, the component of the axial curvature of the tube in the horizontal plane containing the probes 26,26 is directly proportional to the difference between the relative radial displacements of the two probes 26,26 as the compound gauge 10 is advanced through the tube. Due to the direct translation of radial movements of one probe 26 into corresponding axial movements of the LVDT coil 32, and to the direct transmission of radial movements of the other probe 26 into corresponding axial movements of the LVDT core 33, the LVDT 31 will generate a continuous electrical output signal having a voltage corresponding to this difference in radial displacements of the probes 26,26 relative to the respective reference lines defined by the two feet 16,16 on each of the bars 14,14. Thus, as the compound gauge 10 is advanced through the tube 11, the voltage of the output signal from the LVDT 31 provides a direct, real time indication of the axial curvature component for the tube in the plane of the probes 26,26, i.e., the horizontal plane.

A 90° rotation of the tube 11 about its axis preferably next occurs, whereupon the compound gauge 10 is again passed axially through the tube with the probes 26,26 in a horizontal plane. Information as to components of the axial curvature in two mutually perpendicular planes is, thus, obtained. As set forth in greater detail in the previously mentioned W. M. Gresho patent, such information completely characterizes the axial curvature pattern along the length of the tube. The information may be utilized to study such parameters as the root means square value, the maxima, and the periodic content of the axial curvature of the tube.

It is to be understood that the described compound gauge device is simply illustrative of one embodiment of the invention. Another embodiment might utilize two probe carrier bars mounted on a single carrier frame for independent radial movement along diametrically opposed, exterior surfaces of a tube. Two probes, one on each bar, would be coupled mechanically to a single LVDT to indicate the difference in relative radial displacements for the two probes with respect to reference lines established by feet on the two bars. Thus, axial curvature could be explored with respect to an outer wall of the tube, rather than the inner wall. Many other modifications may also be made without departing from the invention.

What is claimed is:

1. In a device for measuring the axial curvature of a tube:
    a carrier;
    a first wall curvature gauge mounted on the carrier, the first wall curvature gauge comprising means contacting the wall surface of the tube at two spaced apart first reference points, and a first probe mounted for radial movement on said means between said spaced apart first reference points to engage a first test point on a wall surface of the tube, the radial position of the first probe with respect to a line between said two spaced apart first reference points indicating wall curvature at said first test point;
    a second wall curvature gauge mounted independently from said first wall curvature gauge on the carrier diametrically opposite said first wall curvature gauge, the second wall curvature gauge comprising means contacting the wall surface of the tube at two spaced apart second reference points and a second probe mounted for radial movement on said means between said spaced apart second reference points to engage a second test point on the wall surface of the tube diametrically opposite said first test point, the radial position of the second probe with respect to a line between said two spaced apart second reference points indicating wall curvature at said second test point; and
    first means, mechanically interconnecting said first and second probes, for providing an indication of the difference between the radial positions of the first and second probes with respect to their associated reference points, thereby to provide a measurement indicating the axial curvature of the tube.

2. In the device of claim 1, said first means comprising:
    second means, coupled to the mechanical interconnection with said first and second probes, for generating an electrical signal having a voltage proportional to the difference between the radial positions of the first and second probes with reference to their respective two spaced apart points.

3. In the device of claim 1, wherein said wall surface of the tube constitutes the inner wall of the tube:
    second means for advancing the carrier axially along the interior of the tube.

4. In the device of claim 1, said first means comprising:
    second means, including a coil and a core mounted coaxially for independent movement in an axial direction, for generating an electrical signal having a voltage indicative of the variable axial position of the core relative to the coil;
    third means, mechanically interconnecting the core with one of said first and second probes, for translating radial movements of said one probe into proportional axial movements of the core; and
    fourth means, mechanically interconnecting the coil with the other of said first and second probes, for translating radial movements of said other probe into proportional axial movements of the coil.

5. In the device of claim 4:
    fifth means for mounting said second means on the carrier with the common axis of the coil and the core extending axially of the tube.

6. In a device for measuring the axial curvature of a tube:
    a carrier;
    a first subcarrier, supported by the carrier, the first subcarrier comprising means contacting the wall surface of the tube at two spaced apart first reference points, and a first probe mounted for radial movement on said means for sensing the radial displacement of a first test point, situated on the surface of the tube, relative to a first axially extending reference line joining the two first reference points on said surface which are spaced at known distances from said first test point at axially opposite sides of the first test point;
    a second subcarrier, supported by the carrier independently of said first subcarrier, the second subcarrier comprising means contacting the wall surface of the tube at two spaced apart second reference points, and a second probe mounted for radial movement on said means for sensing the radial displacement of a second test point, situated diametrically opposite said first test point on said surface of the tube, relative to a second axially extending reference line joining the two second reference points on said surface which are spaced at corresponding known distances from said second test point at axially opposite sides of the second test point;
    first means, mechanically interconnecting said first and second probes, for providing an indication of the difference in relative radial displacements of the first and second probes with respect to the first and second axially extending reference lines, respectively; and
    second means for moving the carrier axially along the tube.

7. In the device of claim 6, said first means comprising:
    third means, coupled to the mechanical interconnection with said first and second probe, for generating an electrical signal having a voltage proportional to the difference in radial positions of the first and second probe with reference to their respective two spaced apart points.

8. In the device of claim 6, said first means comprising:
- third means, including a coil and a core mounted coaxially for independent movement in an axial direction, for generating an electrical signal indicative of the variable axial position of the core relative to the coil;
- fourth means, mechanically interconnecting the core with one of said first and second probes, for translating radial movements of said one probe into proportional axial movements of the core; and
- fifth means, mechanically interconnecting the coil with the other of said first and second probes, for translating radial movements of said other probe into proportional axial movements of the coil.

9. In the device of claim 8:
- sixth means for mounting said first means on the carrier with the common axis of the coil and the core extending axially of the tube.

10. In the device of claim 6, wherein said surface of the tube constitutes an inner wall of the tube, said second means being adapted to advance the carrier axially along the interior of the tube.

11. In the device of claim 10:
- third means supported by the carrier for biasing said first and second probes radially outwardly toward the inner wall surface of the tube.

12. In the device of claim 10:
- third means mounted on the carrier for biasing the first and second subcarriers diametrically apart.

13. In the device of claim 12:
- said first subcarrier means contacts the wall surface at said two first reference points with a pair of first feet projecting radially outwardly from the first subcarrier, the first feet positioned such that, due to the effect of said third means on the first subcarrier, a radially outermost tip of each first foot contacts a different one of said two reference points on the first axially extending reference line; and
- said second subcarrier means contacts the wall surface at said two second reference points with a pair of second feet projecting radially outwardly from the second subcarrier, the second feet positioned such that, due to the biasing of said third means on the second subcarrier, a radially outermost tip of each second foot contacts a different one of said two additional reference points on the second axially extending reference line.

14. A device for measuring the axial curvature of a tube, the device comprising:
- a carrier frame having two sets of spring-loaded, radially extending plungers, the plungers of each set being equiangularly arrayed about the longitudinal axis of the carrier frame and mounted adjacent to a different end of the carrier frame from the other set for supporting the carrier frame coaxially with the longitudinal axis of the tube;
- first and second axially extending subcarriers mounted independently of one another in diametrically opposed positions on the carrier frame, each subcarrier comprising a pair of radially extending feet, each foot mounted adjacent to a different axial end of the subcarrier for contacting adjacent reference points on a wall surface of the tube to define first and second reference lines therebetween adjacent to said first and second subcarriers, respectively, and a probe mounted for radial movement on each subcarrier at a fixed longitudinal position between said two feet;
- first means supported by the carrier frame for biasing said subcarriers diametrically apart;
- second means for biasing each of the probes radially outward so as to engage an adjacent point at one of two diametrically opposed locations on the wall surface of the tube;
- third means for displacing the carrier frame, and with it the subcarriers, axially along the tube; and
- fourth means, mechanically interconnecting each of said subcarrier probes, for generating an electrical signal having a voltage proportional to the instantaneous difference in the radial displacements of the first and second subcarrier probes relative to said first and second diametrically opposed reference lines, respectively.

15. In the device of claim 14, said fourth means comprising:
- fifth means, including a coil and a core mounted coaxially for independent movement in an axial direction, for generating an electrical signal indicative of the variable axial position of the core relative to the coil;
- sixth means, mechanically interconnecting the core with one of said probes, for translating radial movements of said one probe into proportional axial movements of the core; and
- seventh means, mechanically interconnecting the coil with the other of said probes, for translating radial movements of said other probe into proportional axial movements of the coil.

16. In the device of claim 15:
- eighth means for mounting said fourth means on the carrier frame with the common axis of the coil and the core extending axially of the tube.

* * * * *

L-565-PT
(6-69)

UNITED STATES PATENT OFFICE
CERTIFICATE OF CORRECTION

Patent No. 3,821,856            Dated     July 2, 1974

Inventor(s)        W. E. Rapp

It is certified that error appears in the above-identified patent and that said Letters Patent are hereby corrected as shown below:

In the Abstract, line 22, "repsect" should read --respect--.

In the specification, Column 1, line 64, "corresonding" should read --corresponding--. Column 3, line 65, "LVDT toward" should read --LVDT axially toward--.

Signed and sealed this 3rd day of December 1974.

(SEAL)
Attest:

McCOY M. GIBSON JR.
Attesting Officer

C. MARSHALL DANN
Commissioner of Patents